US011092093B2

(12) United States Patent
Lawrence et al.

(10) Patent No.: US 11,092,093 B2

(45) Date of Patent: Aug. 17, 2021

(54) DIFFERENTIAL PRESSURE VALVE BASED BOOST DEVICE INLET PRESSURE OPTIMIZATION

(71) Applicants: David Lawrence, Lake Orion, MI (US); Ethan E Bayer, Lake Orion, MI (US); William P Attard, Brighton, MI (US); Shu Wang, Rochester Hills, MI (US)

(72) Inventors: David Lawrence, Lake Orion, MI (US); Ethan E Bayer, Lake Orion, MI (US); William P Attard, Brighton, MI (US); Shu Wang, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 2 days.

(21) Appl. No.: 16/681,354

(22) Filed: Nov. 12, 2019

(65) Prior Publication Data

US 2020/0158032 A1 May 21, 2020

Related U.S. Application Data

(60) Provisional application No. 62/768,250, filed on Nov. 16, 2018.

(51) Int. Cl.

*F02D 23/00* (2006.01)
*F02M 26/04* (2016.01)
*F02D 21/08* (2006.01)

(52) U.S. Cl.

CPC ............ *F02D 23/00* (2013.01); *F02D 21/08* (2013.01); *F02M 26/04* (2016.02)

(58) Field of Classification Search

CPC ...... F02D 23/00; F02D 21/08; F02D 2250/08; F02D 2250/41; F02D 41/0007;

(Continued)

(56) References Cited

U.S. PATENT DOCUMENTS 7,895,838 B2 3/2011 Ono
8,887,701 B2 11/2014 Nam (Continued)

FOREIGN PATENT DOCUMENTS

| | | | |
|---|---|---|---|
| EP | 1808591 | A2 | 7/2007 |
| JP | 2011163241 | A | 8/2011 |
| WO | 2008120553 | A1 | 10/2008 |

*Primary Examiner* — Jesse S Bogue
*Assistant Examiner* — Loren C Edwards
(74) *Attorney, Agent, or Firm* — Ralph E Smith

(57) ABSTRACT

Techniques for controlling a forced-induction engine having a low pressure cooled exhaust gas recirculation (LPCEGR) system comprise determining a target boost device inlet pressure for each of one or more systems that could require a boost device inlet pressure change as part of their operation and boost device inlet pressure hardware limits for a set of components in the induction system, determining a final target boost device inlet pressure based on the determined sets of target boost device inlet pressures and boost device inlet pressure hardware limits, and controlling a differential pressure (dP) valve based on the final target boost device inlet pressure to balance (i) competing boost device inlet pressure targets of the one or more systems and (ii) the set of boost device inlet pressure hardware limits in order to optimize engine performance and prevent component damage.

16 Claims, 4 Drawing Sheets

(58) Field of Classification Search
CPC ............. F02D 41/2041; F02D 41/0017; F02D 41/003; F02M 26/04; F02M 26/06; F02M 26/08; F02M 26/10; F02B 47/08
See application file for complete search history.

(56) References Cited

U.S. PATENT DOCUMENTS

| | | | | |
|---|---|---|---|---|
| 9,341,127 | B2 | 5/2016 | Brewbaker et al. | |
| 2007/0246028 | A1 | 10/2007 | Fujita et al. | |
| 2012/0090584 | A1 | 4/2012 | Jung | |
| 2016/0102623 | A1* | 4/2016 | Hakeem ............. | F02D 41/0007 701/113 |

* cited by examiner

Air
AF
Controller
Sensors/Valves/Etc.
CAC
ETS
ETS
EGRC
Exhaust
Spark
Fuel
100
1
106
108
109, 111
110
162
158
156
137
112a
112b
118a
120
131
135b
135a
133
139b
152a
141a
118b
127, 129
152b
116a
140a
138a
114a
136a
124
150
160
164a
144a
141b
116b
136b
134b
134a
123
122
104
148
142a
140b
138b
114b
126
164b
128
102
155
154
147
144b
142b
132
130
139a
146
101

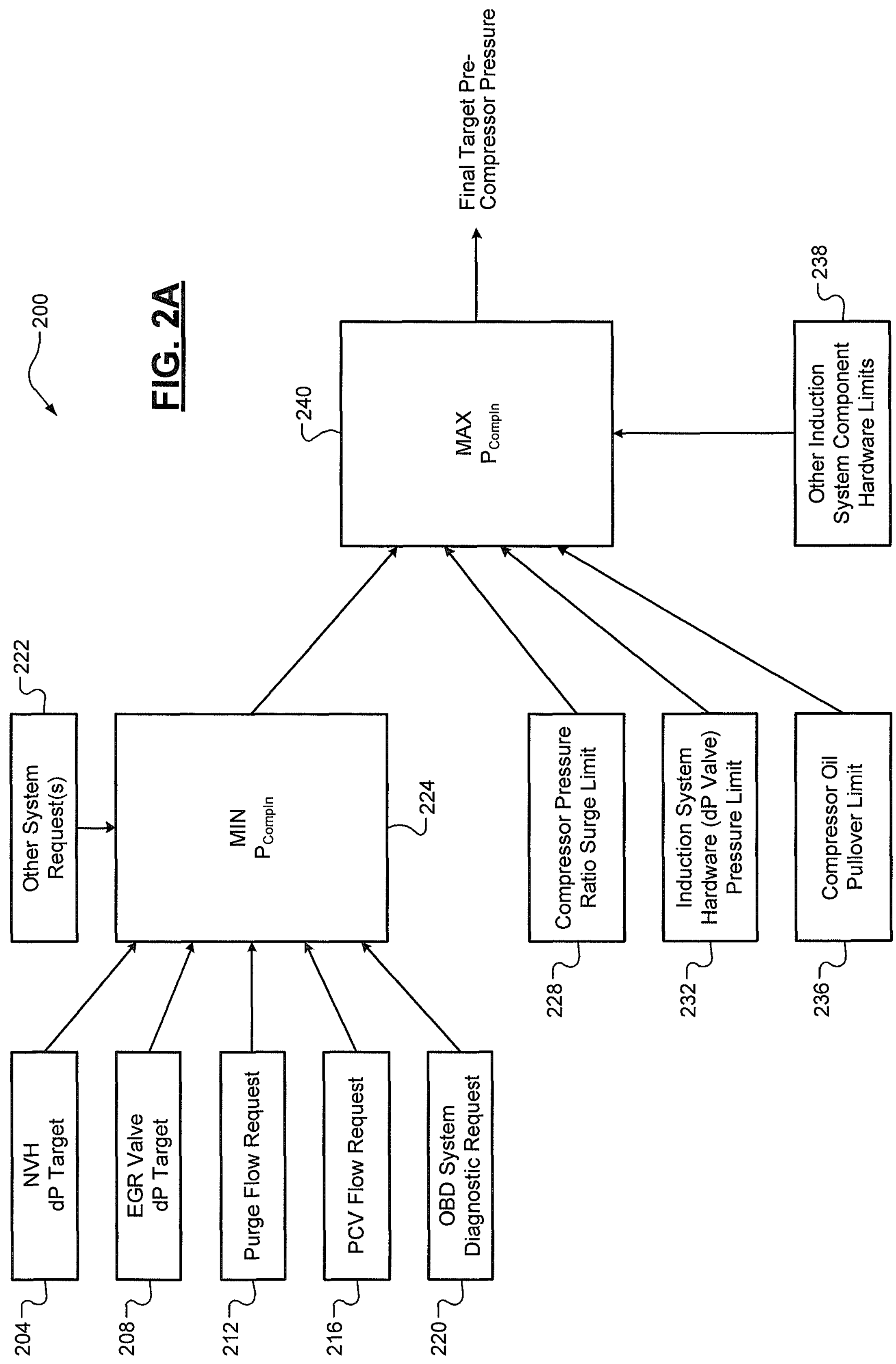
200
FIG. 2A
Final Target Pre-Compressor Pressure
240
MAX $P_{CompIn}$
238
Other Induction System Component Hardware Limits
222
Other System Request(s)
MIN $P_{CompIn}$
224
Compressor Pressure Ratio Surge Limit
228
Induction System Hardware (dP Valve) Pressure Limit
232
Compressor Oil Pullover Limit
236
NVH dP Target
204
EGR Valve dP Target
208
Purge Flow Request
212
PCV Flow Request
216
OBD System Diagnostic Request
220

250
Final Target Pre-Compressor Pressure
Open Loop
Air Box Outlet Pressure
258
Target dP Valve Pre-Compressor Pressure
254
Saturate at Zero
262
Current dP Valve Mass Flow
270
Calibrated dP Valve dP to Position Surface
266
Open Loop + Closed Loop
286
Target dP Valve Position
Closed Loop
Feedback Control Error
274
Measured Pre-Compressor Pressure
278
PI Controller
282

DIFFERENTIAL PRESSURE VALVE BASED BOOST DEVICE INLET PRESSURE OPTIMIZATION

CROSS-REFERENCE TO RELATED APPLICATION(S)

The present U.S. Non-Provisional Application claims the benefit of U.S. Provisional Application No. 62/768,250, filed on Nov. 16, 2018. The disclosure of the above-referenced application is incorporated herein by reference in its entirety.

FIELD

The present application generally relates to low pressure exhaust gas recirculation (LPEGR) systems in forced-induction engines and, more particularly, to techniques for optimizing boost device inlet pressure for the LPEGR system and other related systems.

BACKGROUND

Exhaust gas recirculation (EGR) involves recirculation at least a portion of the exhaust gas produced by an engine back into an induction system of the engine. EGR is typically used to reduce nitrogen oxide (NOx) emissions, to reduce pumping losses and increase engine efficiency, and/or to reduce knock/auto-ignition. In a low pressure EGR (LPEGR) system, exhaust gas is recirculated from a point after a boost device (e.g., a turbine of a turbocharger) through an EGR loop where it is optionally cooled by an EGR cooler (e.g., a low pressure cooled EGR, or LPCEGR system) and then reintroduced into an induction system at a point before the boost device (e.g., a compressor of the turbocharger).

Inaccurate control of a pressure of the air/exhaust mixture before the boost device could result in an insufficient EGR valve delta pressure, which could preclude EGR operation under low engine load conditions, and/or could increase noise/vibration/harshness (NVH) in the LPCEGR system, which could be audible and/or physically noticeable to a driver of the vehicle. In addition, there are other engine systems that are affected by the boost device inlet pressure and thus should be accounted for. Accordingly, while these conventional EGR systems do work well for their intended purpose, there remains a need for improvement in the relevant art.

SUMMARY

According to one example aspect of the invention, a control system for a forced-induction engine comprising a low pressure cooled exhaust gas recirculation (LPCEGR) system is presented. In one exemplary implementation, the control system comprises: a differential pressure (dP) valve (i) disposed in an induction system of the engine at a point upstream from an inlet of a boost device of the engine and a recirculation point of the LPCEGR system and (ii) configured to control a boost device inlet pressure in the induction system, and a controller configured to: determine a set of target boost device inlet pressures comprising a target boost device inlet pressure for each of one or more systems that could require a boost device inlet pressure change as part of their operation, determine a set of boost device inlet pressure hardware limits for a set of components in the induction system, determine a final target boost device inlet pressure based on the determined sets of target boost device inlet pressures and boost device inlet pressure hardware limits, and control the dP valve based on the final target boost device inlet pressure, wherein controlling the dP valve based on the final target boost device inlet pressure balances (i) competing boost device inlet pressure targets of the one or more systems and (ii) the set of boost device inlet pressure hardware limits in order to optimize engine performance and prevent component damage.

In some implementations, the one or more other systems comprise the LPCEGR system, an evaporative emissions (EVAP) system, a crankcase ventilation system, and an on-board diagnostic (OBD) system, and the set of target boost device inlet pressures comprises target boost device inlet pressures for each of a target NVH for the engine, a target flow through the LPCEGR system, a target EVAP purge vapor flow, a target positive crankcase ventilation (PCV) blow-by vapor flow, and a target OBD test pressure. In some implementations, the boost device is a turbocharger and the set of hardware limits comprises a surge limit of a pressure ratio of a compressor of the turbocharger, a pressure limit of the dP valve, and an oil pullover pressure limit of the compressor. In some implementations, the engine is a twin-turbocharged, six-cylinder engine and the LPCEGR system is associated with one turbocharger loop of the engine.

In some implementations, the controller is configured to determine the final target boost device inlet pressure by: determining a minimum of the set of target boost device inlet pressures to obtain an intermediate target boost device inlet pressure, and determining a maximum of the intermediate target boost device inlet pressure and the set of boost device inlet pressure hardware limits to obtain the final boost device inlet pressure target. In some implementations, the controller is configured to control the dP valve based on the final target pre-compressor pressure using a primary open loop control scheme with a secondary closed-loop control scheme. In some implementations, the primary open-loop control scheme comprises: determining a target dP valve boost device inlet pressure based on the final target boost device inlet pressure and an air box outlet pressure, saturating the target dP valve boost device inlet pressure at zero, and determining an open-loop target dP valve position based on the saturated target dP valve boost device inlet pressure and a current dP valve mass flow using a calibrated two-dimensional dP valve boost device inlet pressure to position surface.

In some implementations, the secondary closed-loop control scheme comprises: determining a dP valve position feedback error based on the final target boost device inlet pressure and a measured boost device inlet pressure, and determining a closed-loop target dP valve position based on the dP valve position feedback error using a proportional-integral (PI) control scheme. In some implementations, the controller is further configured to: sum the open-loop and closed-loop target dP valve positions to obtain a final target dP valve position, and command the dP valve to the final target dP valve position to optimize engine performance and prevent component damage.

According to another example aspect of the invention, a method of controlling a forced-induction engine having a LPCEGR system is presented. In one exemplary implementation, the method comprises: determining, by a controller of the engine, a set of target pressures at an inlet of a boost device of the engine, the set of target boost device inlet pressures comprising a target boost device inlet pressure for each of one or more systems that could require a boost device inlet pressure change as part of their operation, determining, by the controller, a set of boost device inlet pressure hardware limits for a set of components in the induction system, determining, by the controller, a final target boost device inlet pressure based on the determined sets of target boost device inlet pressures and boost device inlet pressure hardware limits, and controlling, by the controller, a dP valve based on the final target boost device inlet pressure, wherein the dP valve is (i) disposed in the induction system at a point upstream from the boost device inlet and a recirculation point of the LPCEGR system and (ii) configured to control the boost device inlet pressure, wherein controlling the dP valve based on the final target boost device inlet pressure balances (i) competing boost device inlet pressure targets of the one or more systems and (ii) the set of boost device inlet pressure hardware limits in order to optimize engine performance and prevent component damage.

In some implementations, the one or more other systems comprise the LPCEGR system, an EVAP system, a crankcase ventilation system, and an OBD system, and the set of target boost device inlet pressures comprises target boost device inlet pressures for each of a target NVH for the engine, a target flow through the LPCEGR system, a target EVAP purge vapor flow, a target PCV blow-by vapor flow, and a target OBD test pressure. In some implementations, the boost device is a turbocharger and the set of hardware limits comprises a surge limit of a pressure ratio of a compressor of the turbocharger, a pressure limit of the dP valve, and an oil pullover pressure limit of the compressor. In some implementations, the engine is a twin-turbocharged, six-cylinder engine and the LPCEGR system is associated with one turbocharger loop of the engine.

In some implementations, determining the final target boost device inlet pressure comprises: determining a minimum of the set of target boost device inlet pressures to obtain an intermediate target boost device inlet pressure, and determining a maximum of the intermediate target boost device inlet pressure and the set of boost device inlet pressure hardware limits to obtain the final target boost device. In some implementations, controlling the dP valve based on the final target boost device inlet pressure comprises using a primary open loop control scheme with a secondary closed-loop control scheme. In some implementations, the primary open-loop control scheme comprises: determining a target dP valve boost device inlet pressure based on the final target boost device inlet pressure and an air box outlet pressure, saturating the target dP valve boost device inlet pressure at zero, and determining an open-loop target dP valve position based on the saturated target dP valve boost device inlet pressure and a current dP valve mass flow using a calibrated two-dimensional dP valve boost device inlet pressure to position surface.

In some implementations, the secondary closed-loop control scheme comprises: determining a dP valve position feedback error based on the final target boost device inlet pressure and a measured boost device inlet pressure, and determining a closed-loop target dP valve position based on the dP valve position feedback error using a PI control scheme. In some implementations, the method further comprises: summing, by the controller, the open-loop and closed-loop target dP valve positions to obtain a final target dP valve position, and commanding, by the controller, the dP valve to the final target dP valve position to optimize engine performance and prevent component damage.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2A is a functional block diagram of example target boost device inlet pressure determination architecture balancing competing requirements of the LPCEGR, EVAP, and crankcase ventilation systems and hardware limits of the boost device and a differential pressure (dP) valve according to the principles of the present disclosure;

DETAILED DESCRIPTION

Figure 1:
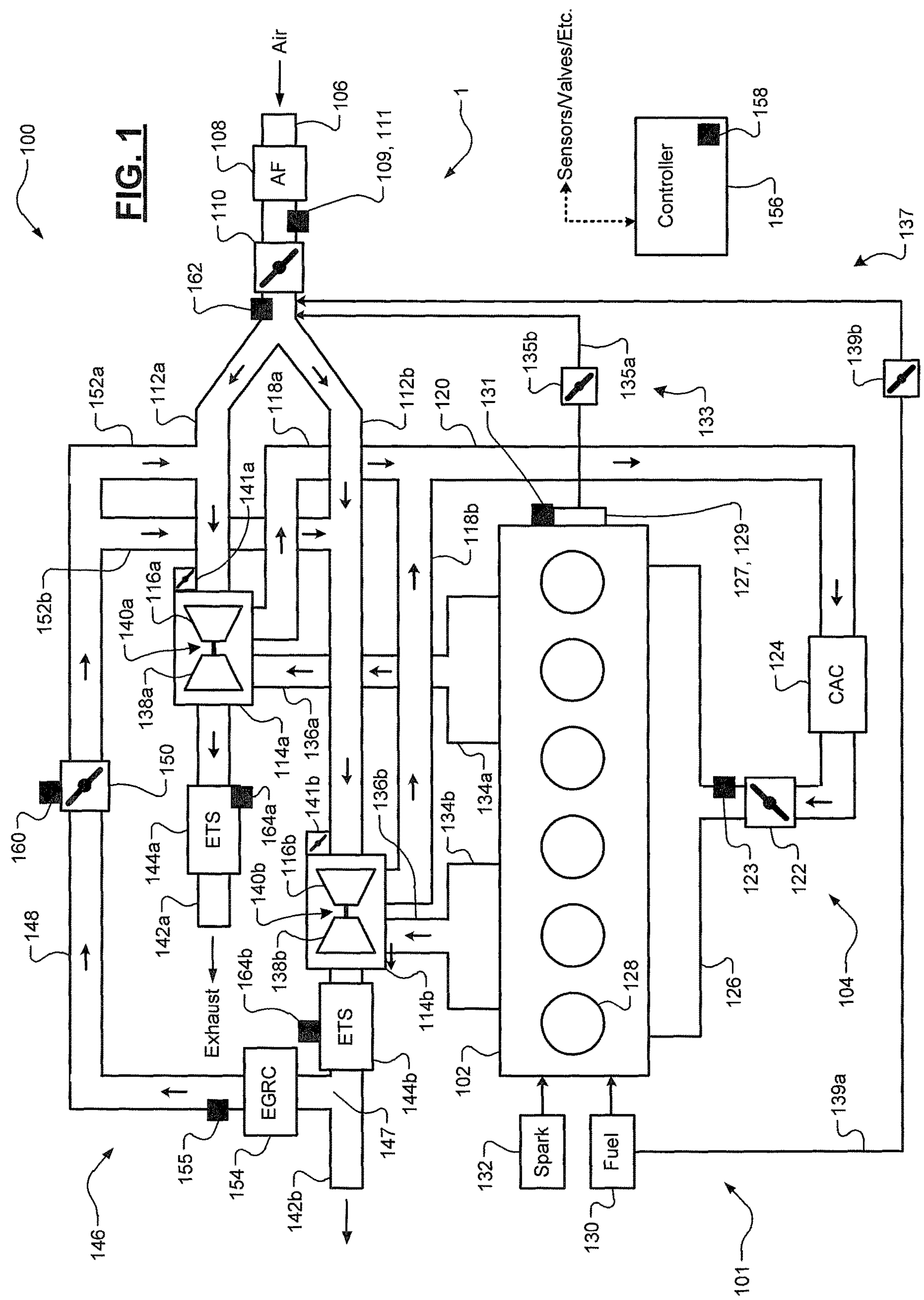
FIG. 1 is a diagram of an example vehicle having a forced-induction engine with a low pressure cooled exhaust gas recirculation (LPCEGR) system, an evaporative emissions (EVAP) system, and a crankcase ventilation system according to the principles of the present disclosure.

As previously discussed, low pressure, cooled exhaust gas recirculation (LPCEGR) systems for forced-induction engines require precise boost device inlet pressure control to enable EGR operation at low engine load conditions and to minimize noise/vibration/harshness (NVH) of the LPCEGR system. The boost device inlet pressure also affects the operation of other systems, such as, but not limited to, a crankcase ventilation system that recirculates blow-by vapors from a crankcase of the engine back into the induction system, and an evaporative emissions (EVAP) system that captures evaporated fuel vapor from a fuel tank and recirculates the fuel vapor back into the induction system. Some of these systems could have competing pressure requirements (e.g., EGR may require at least some EGR valve differential pressure (dP) to properly function, whereas the crankcase ventilation and EVAP systems may require a certain amount of pre-compressor pressure to properly function, whereas closing a dP valve may also reduce exhaust noise and NVH of the LPCEGR system). While these specific systems are discussed herein, it will be appreciated that the techniques of the present disclosure are applicable to any systems that could require a boost device inlet pressure change. Furthermore, there are pressure limits for various hardware components in the induction system (the boost device, the dP valve, etc.). For each of these systems to function properly and without potential damage or malfunction, including the LPCEGR system, the boost device inlet pressure must be precisely controlled to an optimal level for all of the systems.

Accordingly, dP valve based boost device inlet pressure optimization techniques are presented herein. It will be appreciated that these techniques are applicable to any forced-induction engine having one or more boost devices (a turbocharger, a supercharger, etc.) and a low pressure EGR system (e.g., an LPCEGR system). The dP valve is disposed in the induction system upstream from both the boost device inlet (e.g., a turbocharger compressor inlet) and an EGR recirculation point or port. The dP valve position is controlled to vary the boost device inlet pressure which, as previously described herein, could also affect other systems. One example benefit of the dP valve is improved system robustness because it allows for sufficient dP to be present across an EGR valve to ensure robustness to various noise factors (aging effect, aftermarket hardware modification, plugged catalytic converter, gasoline particulate filter (GPF) loading/unloading, etc.). Another example benefit of the dP valve is improved control accuracy because when at least a certain amount of dP is present across the EGR valve (e.g., 2.5 kilopascals, or kPa), EGR can then be estimated very accurately and consistently, and better compared to using other devices (e.g., an intake oxygen or O2 sensor). Yet other example benefits of the dP valve include NVH improvement by running a slightly higher EGR valve dP and reducing inlet NVH and cost reduction via the removal of other now-unnecessary components (an EVAP purge ejector tee, an active noise canceling system, etc.).

Referring now to FIG. 1, an example engine system 101 for a vehicle or vehicle powertrain 100 is illustrated. The engine system 101 includes a gasoline engine 102 that receives air from an induction system 104. While a gasoline engine is specifically illustrated and discussed herein, it will be appreciated that the techniques of the present disclosure could also be applicable to other internal combustion engines having LPCEGR systems. An induction path 106 receives fresh air that is filtered by an air filter (AF) 108. A dP valve 110 regulates the flow of air through the induction path 106 and a pressure in induction paths 112*a*, 112*b* (also referred to herein a "boost device inlet pressure" or a "pre-compressor pressure"). Turbochargers 114*a*, 114*b* comprise compressors 116*a*, 116*b* ("compressors 116") that force air/exhaust gas from the induction paths 112*a*, 112*b* through induction paths 118*a*, 118*b* that converge into a single induction path 120. While two turbochargers 114*a* and 114*b* are shown, it will be appreciated that the engine system 101 could have only one turbocharger and associated piping. Further, while turbocharged forced-induction is illustrated and specifically described herein, it will be appreciated that the techniques of the present disclosure are applicable to any type of forced-induction boost device (e.g., superchargers). A throttle valve 122 regulates the flow of air/exhaust gas through a CAC 124 and into an intake manifold 126. It will be appreciated that the throttle 122 could be implemented upstream from the CAC 124. The air/exhaust gas in the intake manifold 126 is provided to a plurality of cylinders 128, combined with gasoline from a fuel system 130 and combusted by spark from spark plugs 132 to drive pistons (not shown) that generate drive torque at a crankshaft 127 housed by a crankcase 129. While six cylinders are shown, it will be appreciated that the engine 102 could include any suitable number of cylinders (4, 8, etc.). An engine speed (RPM) sensor 131 measures a rotational speed of the crankshaft 127, also known as a speed of the engine 102.

Vapors (e.g., fuel/oil blow-by vapors) sometimes enter the crankcase 129 from the cylinders 128. A crankcase ventilation system 133 recirculates blow-by vapors from the crankcase 129 to any suitable point in the induction system 104 (e.g., after dP valve 110) via a line 135*a* and an optional positive crankcase ventilation (PCV) valve 135*b*. In one exemplary implementation, the fuel system 130 comprises a fuel tank that houses fuel (e.g., gasoline), a fuel rail that houses pressurized fuel, fuel injectors that open/close to inject the pressurized fuel into the engine 102, and a fuel pump that pumps the fuel from the fuel tank to the fuel rail to generate the pressurized fuel. The fuel system 130 could also include an evaporative emissions (EVAP) system 137 that captures fuel or "purge" vapor that evaporates from the fuel in the fuel tank and stores it in a vapor canister. The EVAP system 137 is then able to provide the fuel vapor to any suitable point in the induction system 104 (e.g., after the dP valve 110) via an EVAP line 139*a* and a purge valve 139*b*. Fuel vapor is highly combustible and therefore is able to increase engine power and/or efficiency. Exhaust gas resulting from combustion is expelled from the cylinders 128 into exhaust manifolds 134*a*, 134*b*. Each exhaust manifold 134*a*, 134*b*, for example, could be associated with three of the six cylinders 128. The exhaust gas in exhaust manifold 134*a* flows through exhaust path 136*a* and its kinetic energy drives a turbine 138*a* of turbocharger 114*a*. The turbine 138*a* drives compressor 116*a* via a shaft 140*a*. Similarly, the exhaust gas in exhaust manifold 134*b* flows through exhaust path 136*b* and its kinetic energy drives a turbine 138*b* of turbocharger 114*b*, which in turn drives compressor 116*b* via a shaft 140*b*. Wastegate valves 141*a*, 141*b* regulate turbocharger speed/boost pressure.

The exhaust gas flows from turbines 138*a*, 138*b* through exhaust paths 142*a*, 142*b* and is treated by exhaust treatment systems (ETS) 144*a*, 144*b* to decrease or eliminate emissions before being released into the atmosphere. Non-limiting example components include gasoline particulate filters (GPFs), there-way catalytic converters (TWCs), and mufflers. It will be appreciated that each ETS 144*a*, 144*b* could include other exhaust treatment components. An LPCEGR system 146 recirculates exhaust gas from an EGR pickup point 147 downstream of ETS 144*b* through an EGR path 148 that is regulated by an EGR valve 150. The EGR path 148 splits into separate EGR paths 152*a*, 152*b* which direct the exhaust gas to ports in induction paths 112*a*, 112*b* downstream of the dP valve 110 and upstream of the compressors 116*a*, 116*b*. The LPCEGR system 146 also includes an EGR cooler (EGRC) 154 that cools the exhaust gas. Because turbocharged gasoline engines operate at very high temperatures, cooling of the recirculated exhaust gas could provide for increased performance. A controller 156 controls operation of the engine system 101. In some implementations, the controller 156 includes on-board diagnostic (OBD) functionality, but it will be appreciated that there could be a separate OBD system (not shown). It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be either a single processor or two or more processors operating in a parallel or distributed architecture.

Optional inlet air temperature and humidity sensors 109, 111 measure intake air temperature and humidity. It will be appreciated that these sensors 109, 111 could also be arranged in other suitable positions of the induction system

104. An optional charge air temperature sensor 123 measures ACT at an outlet of the throttle valve 122. An optional EGRC outlet temperature sensor 155 measures a temperature of EGR at an outlet of the EGRC 154. The controller 156 includes a barometric pressure sensor 158 that measures barometric pressure. It will be appreciated that the barometric sensor 158 could be external to the controller 156. An EGR valve delta or differential pressure sensor 160 is disposed proximate to the EGR valve 150 and measures a delta or differential pressure across the EGR valve 150. A dP valve outlet pressure sensor 162 measures a pressure at an outlet of the dP valve 110. As previously mentioned, this dP valve outlet pressure also corresponds to inlet pressures of the compressors 116*a*, 116*b* (i.e., the "boost device inlet pressure" or "pre-compressor pressure"). Lastly, exhaust gas concentration sensors 164*a*, 164*b* measure exhaust gas concentration. In one exemplary implementation, the exhaust gas concentration sensors 164*a*, 164*b* are WRO2 sensors configured to measure an air/fuel ratio (FA) of the exhaust gas. It will be appreciated that the engine system 101 could include other suitable sensors, such as an exhaust gas or back pressure sensor (not shown). All of these sensors provide their measurements to the controller 156, e.g., via a controller area network (CAN, not shown). The controller 156 is also able to control the various valves and other devices/systems described herein, e.g., via the CAN. The controller 156 is also configured to implement at least a portion of the techniques of the present disclosure, which are now described in greater detail.

Referring now to FIG. 2A, a functional block diagram of a control architecture 200 (e.g., for controller 156) for arbitration of a target pre-compressor pressure (compressor or boost device inlet pressure) is illustrated. It will be appreciated that the phrase target pre-compressor inlet pressure or target boost device inlet pressure refers to a pressure target or setpoint for the inlet of the compressor/boost device that the dP valve is then controlled based on. At 204-220, various pre-compressor pressure targets are determined. At 204, an NVH target pre-compressor pressure is determined. This NVH target pre-compressor pressure could be, for example, a function of the air charge, the engine speed, and the EGR level. At 208, an EGR valve target pre-compressor pressure is determined. This EGR valve target pre-compressor pressure could be, for example, a function of the air charge and the engine speed. At 212, an EVAP purge flow target pre-compressor pressure is determined (e.g., an amount of desired purge vapor). This could be based, for example, on a separate determination of if/when purge vapor is required (e.g., during cold starts). At 216, a PCV flow target pre-compressor pressure is determined (e.g., an amount of desired crankcase blow-by vapors). At 220, an on-board diagnostic (OBD) target pre-compressor pressure is determined. This could be, for example, a test pre-compressor pressure as part of an intrusive (i.e., forceful) OBD routine. As previously discussed, it will be appreciated that there could be one or more other systems providing their own pre-compressor pressure target(s) as illustrated by block 222. All of these target pre-compressor pressures are then fed to block 224, where the minimum target pre-compressor pressure is arbitrated or selected and then output to block 240.

At 228-236, various pre-compressor pressure limits for various hardware components are determined. At 228, a target pre-compressor pressure based on the compressor pressure ratio surge limit is determined. This surge limit could be, for example, a pressure ratio at which compressor surge begins. At 232, a target pre-compressor pressure for one or more induction system hardware components protection is determined. One example component that could require protection is the dP valve 110, but it will be appreciated that any suitable hardware components in the induction system 104 could have target pre-compressor pressures for hardware protection purposes. At 236, a target pre-compressor pressure based on the compressor's oil pullover limit is determined. For example only, this could be a pressure at which compressor oil seals begin to fail. As previously discussed, it will be appreciated that there could be one or more other induction system components having pre-compressor pressure limit(s) as illustrated by block 238. All of these target pre-compressor pressures, as well as the minimum target pre-compressor pressure from 224, are then fed to block 240, where the maximum of these target pre-compressor pressures is arbitrated or selected and then output as the final target pre-compressor pressure ($P_{Compin}$).

Figure 2B:
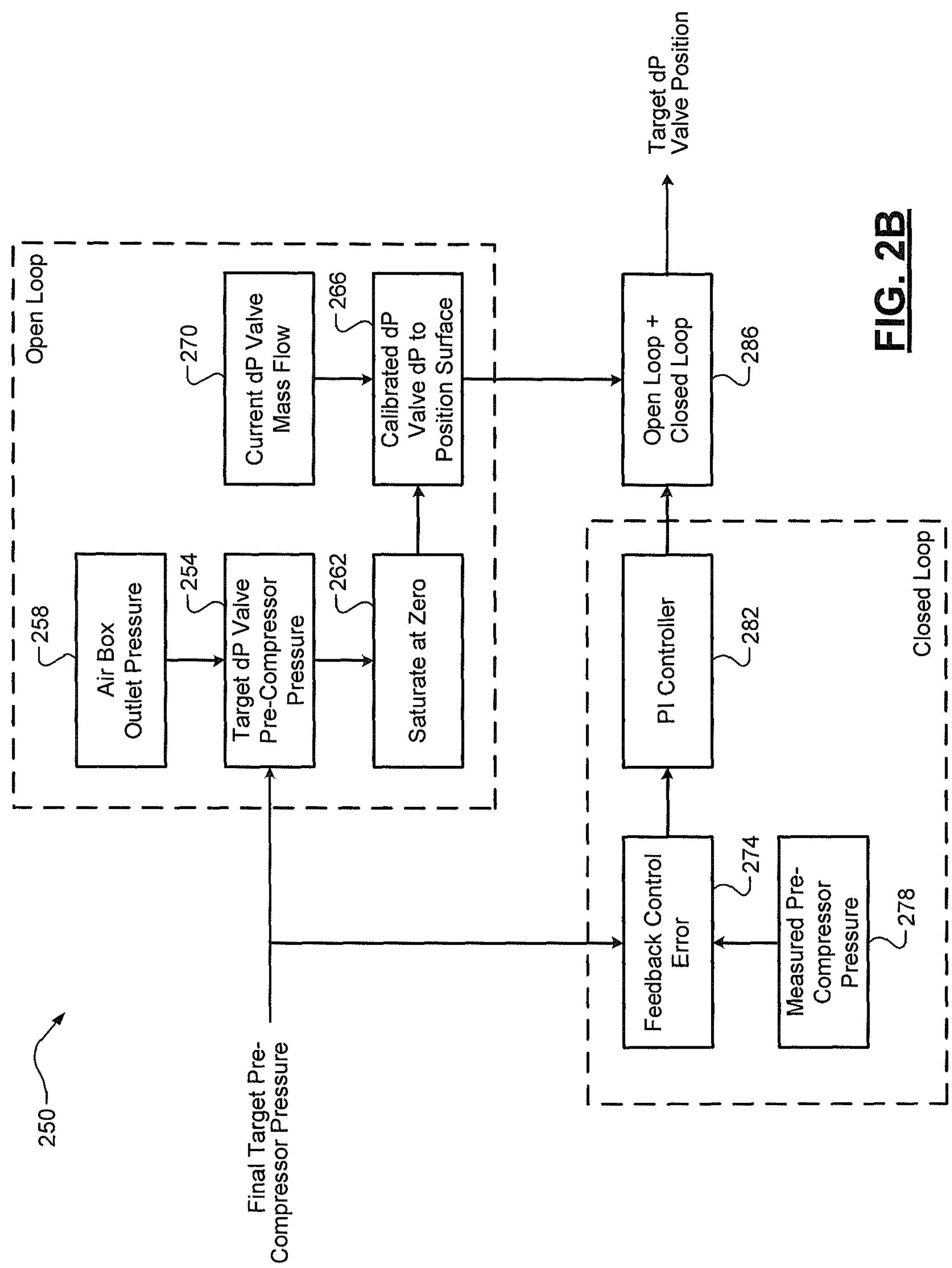
FIG. 2B is a functional block diagram of an example primary open-loop and secondary closed-loop target dP valve position determination and control architecture using the target boost device inlet pressure according to the principles of the present disclosure.

Referring now to FIG. 2B, a functional block diagram of a control architecture 250 (e.g., for controller 156) for coordinated open-loop and closed loop control of the position of the dP valve 110 is illustrated. In an open-loop portion of the architecture 250 (also referred to as a primary portion or primary open-loop control scheme), at 254 a target dP valve pre-compressor pressure is determined based on the final target pre-compressor pressure (from architecture 200 of FIG. 2A as described above) and an air box outlet pressure from 258. The air box comprises the air filter 108 and this pressure could be measured or modeled. At 262, the target dP valve pre-compressor pressure is saturated at zero. At 266, a two-dimensional (2D) calibrated dP valve pre-compressor pressure to position surface is utilized to determine an open-loop target dP valve position based on the saturated target dP valve pre-compressor pressure and the current dP valve mass flow from 270, which could be measured or modeled. In a closed-loop portion of the architecture 250, at 274 a dP valve position feedback control error is calculated based on the final target pre-compressor pressure (from architecture 200 of FIG. 2A as described above) and a measured pre-compressor (compressor inlet) pressure (e.g., from sensor 162) from 278.

At 282, a proportional-integral (PI) or other suitable feedback-based controller (e.g., proportional-integral-derivative, or PID) is utilized to determine a closed-loop target dP valve position based on the dP valve position feedback control error determined at 274. At 286, the open-loop and closed-loop target dP valve positions are combined to obtain a final target (e.g., optimized) dP valve position. While this is likely a straightforward summation, it will be appreciated that weighting could also be applied. This final target dP valve position is then used to control/position the dP valve 110, thereby optimizing the pre-compressor for all of the various systems (EGR, crankcase ventilation system, EVAP, etc.). This optimal control could optimize or otherwise improve engine performance/efficiency and/or prevent or mitigate potential component damage, thereby reducing potential warranty costs. It will be appreciated that a control method of the present disclosure could be implemented by the controller 156 or another suitable vehicle control system and could include some or all of the various steps described above and as illustrated in the control architectures of FIGS. 2A-2B. Such a control method is illustrated in FIG. 3 and will now be described in greater detail.

Figure 3:
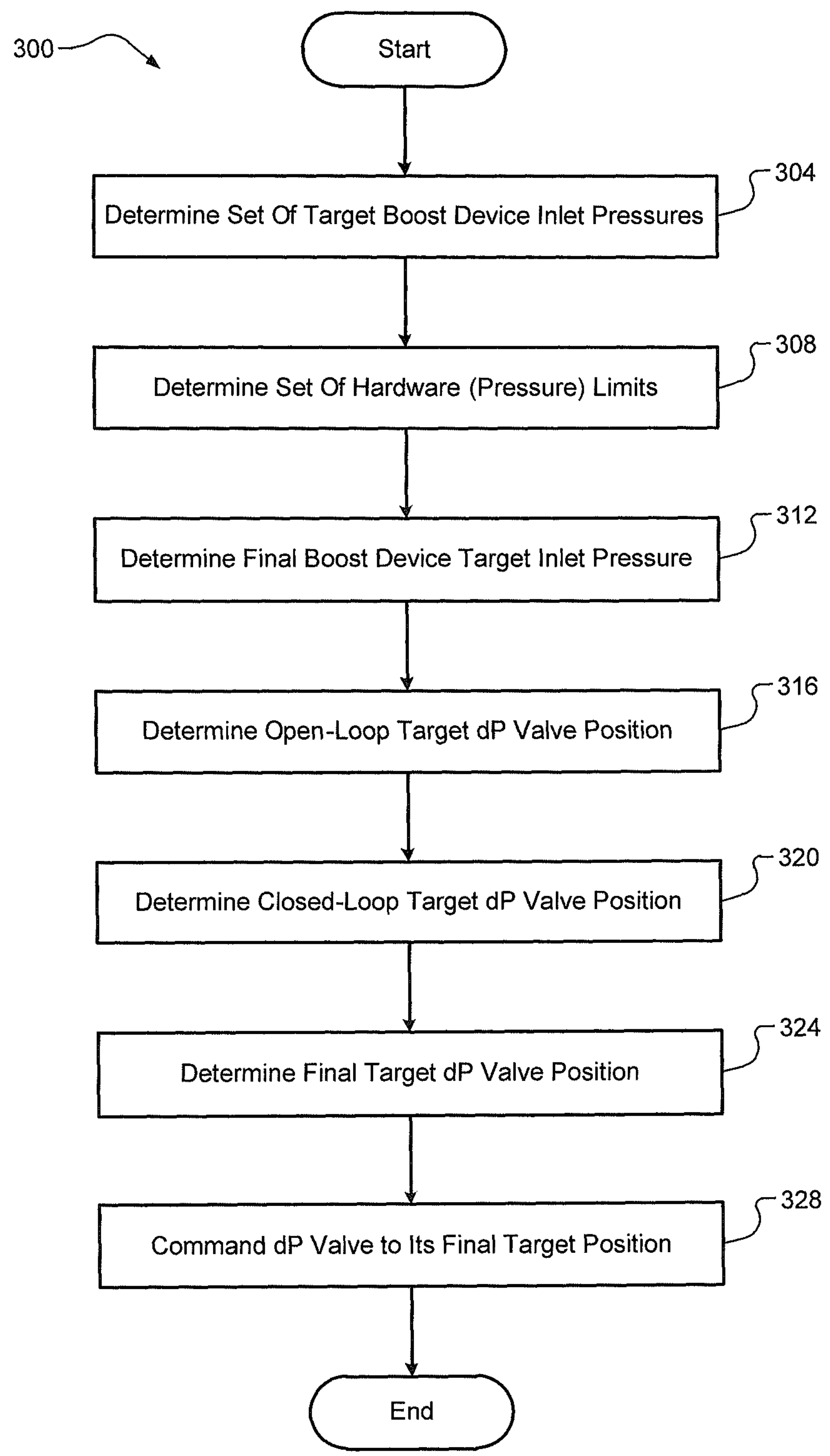
FIG. 3 is a flow diagram of an example method of controlling a differential pressure (dP) valve of a forced-induction engine to balance competing requirements of an LPCEGR system, an EVAP system, and a crankcase ventilation system, and hardware limits of the boost device and the dP valve, according to the principles of the present disclosure.

Referring now to FIG. 3, a flow diagram of an example method 300 of controlling a dP valve of a forced-induction engine valve to balance competing requirements of an LPCEGR system, an EVAP system, and a crankcase ventilation system, and hardware limits of a boost device and the dP valve, according to the principles of the present disclosure is illustrated. While applicable to any suitable forced-induction engine having the above-mentioned systems, the method 300 will be described herein with reference to engine system 101 and its controller 156. At 304, the controller 156 determines a set of target pre-compressor pressures comprising target pre-compressor pressures in the induction system 104 of the engine 102 for at least the LPCEGR system 146, the EVAP system 137, and the crankcase ventilation system 133. At 308, the controller 156 determines a set of hardware limits for the turbocharger compressor and for the dP valve 110. For example only, these hardware limits could be pre-determined or provided by suppliers and could be stored in the memory of the controller 156. At 312, the controller 156 determines a final target pre-compressor pressure based on the determined sets of target pre-compressor pressures and hardware limits. For example only, this could be the minimum of the set of target pre-compressor pressures followed by the maximum of the minimum target pre-compressor pressure and the hardware limits. At 316, the controller 156 determines an open-loop target dP valve position based on the final target pre-compressor pressure. At 320, the controller 156 determines a closed-loop target dP valve position based on the final target pre-compressor pressure. While shown sequentially, it will be appreciated that steps 316 and 320 could be performed simultaneously at least partially overlapping. At 324, the controller 156 determines a final target dP valve position based on the open-loop and closed-loop target dP valve positions (e.g., a summation of the two). At 328, the controller 156 commands the dP valve 110 to the final target dP valve position and the method 300 then ends or returns to 304 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a forced-induction engine comprising a low pressure cooled exhaust gas recirculation (LPCEGR) system, the control system comprising:

a differential pressure (dP) valve (i) disposed in an induction system of the engine at a point upstream from an inlet of a boost device of the engine and a recirculation point of the LPCEGR system and (ii) configured to control a boost device inlet pressure in the induction system; and a controller configured to:

determine a set of target boost device inlet pressures including a target boost device inlet pressure for each of one or more systems that could require a boost device inlet pressure change as part of their operation;

determine a set of boost device inlet pressure hardware limits for a set of components in the induction system;

determine a final target boost device inlet pressure based on the determined set of target boost device inlet pressures and the determined set of boost device inlet pressure hardware limits by (i) determining a minimum of the set of target boost device inlet pressures to obtain an intermediate target boost device inlet pressure and (ii) determining a maximum of the intermediate target boost device inlet pressure and the set of boost device inlet pressure hardware limits to obtain the final target boost device inlet pressure; and control the dP valve based on the final target boost device inlet pressure, wherein controlling the dP valve based on the final target boost device inlet pressure balances (i) competing boost device inlet pressure targets of the one or more systems and (ii) the set of boost device inlet pressure hardware limits in order to optimize engine performance and prevent component damage.

2. The control system of claim 1, wherein:

the one or more systems comprise the LPCEGR system, an evaporative emissions (EVAP) system, a crankcase ventilation system, and an on-board diagnostic (OBD) system; and the set of target boost device inlet pressures comprises target boost device inlet pressures for each of a target NVH for the engine, a target flow through the LPCEGR system, a target EVAP purge vapor flow, a target positive crankcase ventilation (PCV) blow-by vapor flow, and a target OBD test pressure.

3. The control system of claim 1, wherein the boost device is a turbocharger and the set of hardware limits comprises a surge limit of a pressure ratio of a compressor of the turbocharger, a pressure limit of the dP valve, and an oil pullover pressure limit of the compressor.

4. The control system of claim 1, wherein the controller is configured to control the dP valve based on the final target boost device inlet pressure using a primary opcn loop open-loop control scheme with a secondary closed-loop control scheme.

5. The control system of claim 4, wherein the primary open-loop control scheme comprises:

determining a target dP valve boost device inlet pressure based on the final target boost device inlet pressure and an air box outlet pressure;

saturating the target dP valve boost device inlet pressure at zero; and determining, using a calibrated two-dimensional table, an open-loop target dP valve position based on the saturated target dP valve boost device inlet pressure and a current dP valve mass flow.

6. The control system of claim 5, wherein the secondary closed-loop control scheme comprises:

determining a dP valve position feedback error based on the final target boost device inlet pressure and a measured boost device inlet pressure; and determining a closed-loop target dP valve position based on the dP valve position feedback error using a proportional-integral (PI) control scheme.

7. The control system of claim 6, wherein the controller is further configured to:

sum the open-loop and closed-loop target dP valve positions to obtain a final target dP valve position; and command the dP valve to the final target dP valve position to optimize the engine performance and prevent the component damage.

8. The control system of claim 1, wherein the engine is a twin-turbocharged, six-cylinder engine and the LPCEGR system is associated with one turbocharger loop of the engine.

9. A method of controlling a forced-induction engine having a low pressure cooled exhaust gas recirculation (LPCEGR) system, the method comprising:

determining, by a controller of the engine, a set of target boost device inlet pressures at an inlet of a boost device of the engine, the set of target boost device inlet pressures comprising a target boost device inlet pressure for each of one or more systems that could require a boost device inlet pressure change as part of their operation;

determining, by the controller, a set of boost device inlet pressure hardware limits for a set of components in an induction system of the engine;

determining, by the controller, a final target boost device inlet pressure based on the determined set of target boost device inlet pressures and the determined set of boost device inlet pressure hardware limits by (i) determining a minimum of the set of target boost device inlet pressures to obtain an intermediate target boost device inlet pressure and (ii) determining a maximum of the intermediate target boost device inlet pressure and the set of boost device inlet pressure hardware limits to obtain the final target boost device inlet pressure; and controlling, by the controller, a differential pressure (dP) valve based on the final target boost device inlet pressure, wherein the dP valve is (i) disposed in the induction system at a point upstream from the boost device inlet and a recirculation point of the LPCEGR system and (ii) configured to control a boost device inlet pressure, wherein controlling the dP valve based on the final target boost device inlet pressure balances (i) competing boost device inlet pressure targets of the one or more systems and (ii) the set of boost device inlet pressure hardware limits in order to optimize engine performance and prevent component damage.

10. The method of claim 9, wherein:

the one or more systems comprise the LPCEGR system, an evaporative emissions (EVAP) system, a crankcase ventilation system, and an on-board diagnostic (OBD) system; and the set of target boost device inlet pressures comprises target boost device inlet pressures for each of a target NVH for the engine, a target flow through the LPCEGR system, a target EVAP purge vapor flow, a target positive crankcase ventilation (PCV) blow-by vapor flow, and a target OBD test pressure.

11. The method of claim 9, wherein the boost device is a turbocharger and the set of hardware limits comprises a surge limit of a pressure ratio of a compressor of the turbocharger, a pressure limit of the dP valve, and an oil pullover pressure limit of the compressor.

12. The method of claim 9, wherein controlling the dP valve based on the final target boost device inlet pressure comprises using a primary open-loop control scheme with a secondary closed-loop control scheme.

13. The method of claim 12, wherein the primary open-loop control scheme comprises:

determining a target dP valve boost device inlet pressure based on the final target boost device inlet pressure and an air box outlet pressure;

saturating the target dP valve boost device inlet pressure at zero; and determining, using a calibrated two-dimensional table, an open-loop target dP valve position based on the saturated target dP valve boost device inlet pressure and a current dP valve mass flow.

14. The method of claim 13, wherein the secondary closed-loop control scheme comprises:

determining a dP valve position feedback error based on the final target boost device inlet pressure and a measured boost device inlet pressure; and determining a closed-loop target dP valve position based on the dP valve position feedback error using a proportional-integral (P1) control scheme.

15. The method of claim 14, further comprising:

summing, by the controller, the open-loop and closed-loop target dP valve positions to obtain a final target dP valve position; and commanding, by the controller, the dP valve to the final target dP valve position to optimize the engine performance and prevent the component damage.

16. The method of claim 9, wherein the engine is a twin-turbocharged, six-cylinder engine and the LPCEGR system is associated with one turbocharger loop of the engine.

* * * * *